United States Patent
Ono et al.

(10) Patent No.: US 6,238,045 B1
(45) Date of Patent: May 29, 2001

(54) IMAGE FORMING METHOD, INK-JET RECORDING METHOD AND INSTRUMENTS USED IN SUCH METHODS

(75) Inventors: Eriko Ono, Kawasaki; Yutaka Kurabayashi, Tokorozawa; Shinya Mishina; Shinichi Sato, both of Kawasaki; Katsuhiko Takahashi, Yokohama; Masashi Ogasawara, Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/025,253

(22) Filed: Feb. 18, 1998

(30) Foreign Application Priority Data

Feb. 18, 1997 (JP) .................................. 9-048523

(51) Int. Cl.⁷ ........................................ B41J 2/17
(52) U.S. Cl. .................. 347/96; 347/100; 106/31.13
(58) Field of Search .................. 347/100, 96, 58, 347/95; 106/31.27, 31.6, 31.17

(56) References Cited

U.S. PATENT DOCUMENTS

| | | |
|---|---|---|
| 5,485,188 | 1/1996 | Tochihara et al. ............... 347/100 |
| 5,549,740 | 8/1996 | Takahashi et al. ............... 106/20 R |
| 5,614,007 | 3/1997 | Kurabayashi et al. ............ 106/22 R |
| 5,618,338 | 4/1997 | Kurabayashi et al. ............ 106/26 R |
| 5,623,294 | 4/1997 | Takizawa et al. ................. 347/98 |
| 5,624,484 | 4/1997 | Takahashi et al. .............. 106/31.75 |
| 5,700,314 | 12/1997 | Kurabayashi et al. ........... 106/31.27 |
| 6,003,987 | * 12/1999 | Yamamoto et al. ............... 347/100 |
| 6,028,046 | * 2/2000 | Arif .................................. 510/356 |

FOREIGN PATENT DOCUMENTS

| | | |
|---|---|---|
| 55-65269 | 5/1980 | (JP) . |
| 55-66976 | 5/1980 | (JP) . |
| 63-299971 | 12/1988 | (JP) . |
| 64-9279 | 1/1989 | (JP) . |
| 64-63185 | 3/1989 | (JP) . |

* cited by examiner

Primary Examiner—John Barlow
Assistant Examiner—Michael S. Brooke
(74) Attorney, Agent, or Firm—Fitzpatrick, Cella, Harper & Scinto

(57) ABSTRACT

An image forming method to apply an ink to a printing medium includes applying a liquid composition having a polarity different from a polarity of the ink to an image forming region formed by the ink and the vicinity of the image forming region on the printing medium prior to the application of the ink, wherein a surface tension of the liquid composition is higher than that of the ink.

18 Claims, 6 Drawing Sheets

IMAGE FORMING METHOD, INK-JET RECORDING METHOD AND INSTRUMENTS USED IN SUCH METHODS

BACKGROUND OF THE INVENTION

1. Field of the Invention

The present invention relates to an image forming method, an ink-jet recording method and instruments used in such methods.

2. Related Background Art

An ink-jet recording method is a system in which droplets of an ink are ejected to apply the ink to a recording (printing) medium such as paper, thereby conducting recording. In particular, according to the ink-jet recording method of the system disclosed in Japanese Patent Publication Nos. 61-59911, 61-59912 or 61-59914, in which an electrothermal converter is used as an ejection-energy supply means X apply thermal energy to an ink so as to generate bubble thereby ejecting droplets of the ink, the formation of high-density multi-orifice recording head can be realized with ease, and high-resolution and high-quality images can be recorded at high speed.

However, inks used in the conventional ink-jet recording methods generally comprise, as a principal component, water, and include additionally a water-soluble high boiling solvent such as glycol for the purpose of preventing drying and clogging at orifices, and the like. When such an ink has been used to conduct recording on plain paper, there have been experienced such problems that fixing ability cannot be sufficiently achieved, and image irregularity occurs, which is attributed to the uneven distribution of a filler and a size of the surface of the recording paper. In particular, when it is intended to form color images, plural inks of different colors are overlapped one after another before an ink of a certain color is fixed to the recording paper. Therefore, color bleeding and uneven color mixing have occurred at portions of boundaries between images of different colors (this phenomenon will hereinafter be referred to as "bleeding" simply), resulting in a failure to obtain satisfactory images.

As a means for enhancing fixing ability of inks, Japanese Patent Application Laid-Open No. 55-65269 discloses the addition of a compound capable of enhancing penetrability, such as a surfactant, to the inks. Besides, Japanese Patent Application Laid-Open No. 55-66976 discloses the use of inks comprising, as a principal component, a volatile solvent. However, the former method, in which the surfactant is added to the inks, has involved a disadvantage that although the penetrability of the inks into recording paper is improved, and so the fixing ability and anti-bleeding property of the inks are improved to some extent, the optical density and saturation of the resulting image are lowered because coloring materials contained in the inks also penetrate deeply into the recording paper. In addition, the inks have also involved a problem that they spread in lateral directions, resulting in reduction of edge sharpness and resolution. On the other hand, the latter method, in which the inks comprising, as a principal component, the volatile solvent are used, has been liable to cause clogging due to the evaporation of the solvent in a nozzle of a recording head in addition to the above-described disadvantages attendant on the former method. Such methods have hence not been preferred.

In order to improve the above-described problems, there have been further proposed methods in which a liquid capable of making the quality of images better is applied in advance to a recording medium prior to ejection of an ink.

For example, Japanese Patent Application Laid-Open No. 63-299971 discloses a method in which a liquid comprising an organic compound having two or more cationic groups per molecule is applied to a recording medium, and recording is then conducted with inks comprising an anionic dye. Japanese Patent Application Laid-Open No. 64-9279 discloses a method in which an acidic liquid containing succinic acid is applied to a recording medium, and recording is then conducted with inks comprising an anionic dye. Further, Japanese Patent Application Laid-Open No. 64-63185 discloses a method in which a liquid, which insolubilizes dyes, is applied to a recording medium prior to recording.

However, these methods involve a peculiar problem liable to arise in the case where heads for separately ejecting a liquid composition and an ink, which respectively contain substances different in polarity from each other (the difference in polarity as referred to herein means a difference between anionic and cationic polarities; when both substances different in polarity are mixed, a reaction takes place between the anionic and cationic sites of such substances to form an aggregate insoluble in water), are situated in the vicinity of each other.

When an ink ejected from a head flies in the form of spray in the air and adheres to a face of a head for ejecting another ink different in polarity, the face becomes liable to stain. Such a phenomenon becomes marked when it is intended to print an image high in printing duty.

Therefore, when such images are continuously printed, it is necessary to devise how to wipe the face, such as increasing the number of wipings, resulting in an offer of problems such as reduction in throughput and increase in cost.

SUMMARY OF THE INVENTION

It is therefore an object of the present invention to provide an image forming method and an ink-jet recording method, which permit the formation of images having good water fastness and print quality on so-called plain paper and the provision of images having excellent print quality even in continuous printing, and have excellent reliability in ink-jet recording.

It is another object of the present invention to provide devices and instruments used in the methods mentioned above.

The above objects can be achieved by the present invention described below.

In one aspect of the present invention, there is thus provided an image forming method to apply an ink to a printing medium, which method comprises applying a liquid composition having a polarity different from a polarity of the ink to an image forming region formed by the ink and the vicinity of the image forming region on the printing medium prior to the application of the ink, wherein a surface tension of the liquid composition is higher than that of the ink.

In the image forming method, it may be preferable that the liquid composition comprises a cationic compound, and the ink comprises an anionic compound.

In the image forming method, it may also be preferable that the liquid composition comprises a cationic compound, and the ink comprises a dye or pigment having an anionic group.

In the image forming method, it may further be preferable that the liquid composition comprises a cationic compound, and the ink comprises an anionic compound and a dye or pigment having an anionic group.

In the image forming method, it may still further be preferable that the liquid composition comprises an anionic compound, and the ink comprises a cationic compound.

In the image forming method, it may yet still further be preferable that the liquid composition comprises an anionic compound, and the ink comprises a dye or pigment having a cationic group.

In the image forming method, it may yet still further be preferable that the liquid composition comprises an anionic compound, and the ink comprises a cationic compound and a dye or pigment having a cationic group.

In the image forming method, it may yet still further be preferable that the surface tension of the liquid composition to be ejected first is 40 to 60 dyne/cm at 25° C. and is higher than that of the ink to be ejected later.

In the image forming method, it may yet still further be more preferable that the surface tension of the liquid composition to be ejected first is 45 to 55 dyne/cm at 25° C. and is higher than that of the ink to be ejected later.

In the image forming method, it may yet still further be preferable that the surface tension of the ink to be ejected later is 20 to 45 dyne/cm at 25° C.

In the image forming method, it may yet still further be preferable that the liquid composition and the ink are applied by an ink-jet system.

In another aspect of the present invention, there is also provided an ink-jet recording method to apply an ink to a printing medium by an ink-jet system, which method comprises applying a liquid composition having a polarity different from a polarity of the ink by the ink-jet system to an image forming region formed by the ink and the vicinity of the image forming region on the printing medium prior to the application of the ink, wherein a surface tension of the liquid composition is higher than that of the ink.

In the ink-jet recording method, it may be preferable that the ink-jet system is a system in which thermal energy is applied to the ink to eject droplets of the ink.

In a further aspect of the present invention, there is also provided a recording unit equipped with an ink container with an ink held therein and a head from which the ink is ejected in the form of droplets, wherein the unit is used in the image forming method described above.

In the recording unit, it may be preferable that the head is a head in which thermal energy is applied to the ink to eject droplets of the ink.

In the recording unit, it may also be preferable that the ink container contains an ink-absorbing member therein.

In the recording unit, it may further be preferable that the ink container is formed of polyurethane, cellulose or polyvinyl acetate.

In a still further aspect of the present invention, there is also provided an ink cartridge having an ink container with an ink held therein, wherein the cartridge is used in the image forming method described above.

In the ink cartridge, it may be preferable that the ink container is formed of a polyolefin at its surface with which the ink comes into contact.

In a yet still further aspect of the present invention, there is also provided an ink-jet recording apparatus comprising a recording unit equipped with an ink container with an ink held therein and a head from which the ink is ejected in the form of droplets, wherein the apparatus is used in the image forming method described above.

In the ink-jet recording apparatus, it may be preferable that the head is a type in which thermal energy is applied to the ink to eject droplets of the ink.

In the ink-jet recording apparatus, it may also be preferable that the ink container contains an ink-absorbing member therein.

In the ink-jet recording apparatus, it may further be preferable that the ink container is formed of polyurethane, cellulose or polyvinyl acetate.

In a yet still further aspect of the present invention, there is also provided an ink-jet recording apparatus comprising a recording head for ejecting droplets of an ink, an ink cartridge having an ink container with the ink held therein, and an ink feeder for feeding the ink from the ink cartridge to the recording head, wherein the apparatus is used in the image forming method described above.

In the ink-jet recording apparatus, it may be preferable that the recording head is a head in which thermal energy is applied to the ink to eject droplets of the ink.

In the ink-jet recording apparatus, it may also be preferable that the ink container is formed of a polyolefin at its surface with which the ink comes into contact.

DESCRIPTION OF THE PREFERRED EMBODIMENTS

Figure 1:
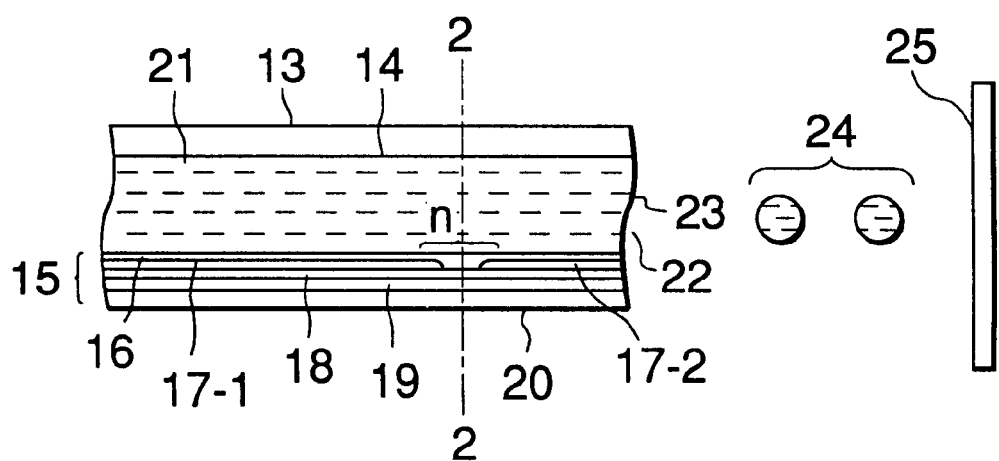
FIG. 1 is a longitudinal cross-sectional view of a head of an ink-jet recording apparatus.

The present invention will hereinafter be described in detail.

The present invention is directed to an image forming method and an ink-jet recording method, comprising ejecting a liquid composition and an ink, in which at least two compounds different in polarity from each other are contained, toward a printing medium to form an image, wherein a surface tension of the liquid composition to be ejected first is higher than that of the ink to be ejected later, and instruments used in such methods.

In an ink set composed of a liquid composition and an ink, which are different in polarity from each other, when using an ink set characterized in that a surface tension of a liquid composition to be ejected first is higher than that of an ink to be ejected later, images having excellent print quality can be provided even when printing is continuously conducted. This is considered to be attributable to the fact that those other than the so-called main dots, such as satellite dots and microdots, are difficult to be generated. At present, there is a demand for speedup of, in particular, printers. However, the use of the above ink set permits to prevent occurrence of satellite dots and microdots even when printing is conducted with high drive frequency in particular. Therefore, it is possible to prevent occurrence of spray mist in the vicinity of an orifice face, and hence to prevent adhesion of liquid composition to a face of the following head for ejecting the ink. It is thus considered that impact accuracy on the medium is improved, and so images having high quality can be always provided.

The preferred embodiments of the present invention will then be described to explain the present invention in more detail.

The image forming method according to the present invention to apply an ink to a printing medium comprises applying a liquid composition having a polarity different from a polarity of the ink to an image forming region formed by the ink and the vicinity of the image forming region on the printing medium prior to the application of the ink, wherein a surface tension of the liquid composition is higher than that of the ink.

The image forming method according to the present invention is also characterized in that the surface tension of the liquid composition to be ejected first is 40 to 60 dyne/cm at 25° C. and is higher than that of the ink to be ejected later. If the surface tension of the liquid composition is lower than 40 dyne/cm, those other than the main dots, such as satellite dots and microdots, are easily generated. If the surface tension exceeds 60 dyne/cm on the other hand, leakage of the liquid composition is caused due to the compatibility of the liquid composition with a tank thereof, which may cause a head to break down. The liquid composition having such a high surface tension is hence not very preferred. It is more preferable that the surface tension of the liquid composition to be ejected first is 45 to 55 dyne/cm at 25° C. and is higher than that of the ink to be ejected later. It is preferable that the surface tension of the liquid composition falls within this range because the print quality of the resulting image and the compatibility of the liquid composition with the tank thereof are more improved.

When the surface tension of the liquid composition falls within the range of from 40 to 60 dyne/cm, it is desirable that a difference in surface tension between the liquid composition and the ink be 1 to 40 dyne/cm, preferably 5 to 30 dyne/cm.

Components of the liquid compositions and inks useful in the practice of the present invention will hereinafter be described specifically. The liquid compositions and inks used in the present invention generally comprise water, a water-soluble organic solvent and other additives in addition to an anionic or cationic substance.

Specific examples of the water-soluble organic solvents used in the present invention include amides such as dimethylformamide and dimethylacetamide; ketones such as acetone; ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, thiodiglycol, hexylene glycol and diethylene glycol; 1,2,6-hexanetriol; glycerol; lower alkyl ethers of polyhydric alcohols, such as ethylene glycol monomethyl (or monoethyl) ether and diethylene glycol monomethyl (or monoethyl) ether; N-methyl-2-pyrrolidone; 1,3-dimethyl-2-imidazolidinone; sulfolane; dimethyl sulfoxide; cyclic amide compounds such as 2-pyrrolidone and ε-caprolactam; and imide compounds such as succinimide.

The content of the water-soluble organic solvent in the ink is generally within a range of from 1 to 40% by weight, preferably from 3 to 30% by weight, based on the total weight of the ink.

Besides, the content of water in the ink is within a range of from 30 to 95% by weight. If the content of water in the ink is lower than 30% by weight, the solubility of a coloring material, and the like are decreased, and the viscosity of the ink is also increased. It is hence not preferable to use water in such a low content. If the content of water is higher than 95% by weight on the other hand, the crusting property of the ink cannot be fully satisfied because components to be evaporated become too great.

Examples of the cationic compound used in the present invention include polyallylamine, polyamine sulfone, polyvinylamine, chitosan, and neutralized products and partially neutralized products of these compounds with an acid such as hydrochloric acid or acetic acid. It goes without saying that the cationic compounds are not limited to these compounds.

Examples of the anionic compound used in the present invention include polyacrylic acid, polymethacrylic acid, styrene-acrylic acid copolymers, styrene-acrylic acid-alkyl acrylate copolymers, styrene-maleic acid-alkyl acrylate copolymers, styrene-methacrylic acid copolymers, styrene-methacrylic acid-alkyl acrylate copolymers, polysaccharides such as alginic acid and carboxymethyl cellulose, polyvinyl sulfate, and alkali salts of these substances. The alkali salts include salts with alkali metals such as sodium, lithium and potassium, and besides ammonium salts, alkylamine salts and alkanolamine salts. These substances may be used either singly or in any suitable combination thereof.

Each of the liquid compositions according to the present invention may be preferably colorless, but may be palely colored so far as a printing medium is scarcely colored when printing is conducted on the printing medium with only the liquid composition, and the color tones of color inks are not changed when the liquid composition is mixed with the respective color inks on a printing medium or the like.

With respect to ranges of preferable physical properties at about 25° C. of the liquid compositions and inks used in the present invention, it is desirable that the pH be within a range of from 3 to 12, preferably from 3 to 8, more preferably from 3 to 5, when the liquid compositions and inks contain a cationic compound, or from 5 to 12, preferably from 5 to 10, when the liquid compositions and inks contain an anionic compound, and the viscosity be within a range of from 1 to 30 cP. The liquid compositions and inks may suitably contain additives such as viscosity modifiers, pH adjusters, antiseptics, surfactants, antioxidants and evaporation accelerators as needed.

Incidentally, the surface tension of the ink is preferably within a range of from 20 to 45 dyne/cm at 25° C.

The inks used in the present invention will hereinafter be described.

The inks used in the present invention separately comprise, as a coloring material, a water-soluble dye or a pigment each of which contains an anionic or cationic group.

No particular limitation is imposed on the water-soluble dyes having an anionic group used in the present invention so far as they are water-soluble acid dyes, direct dyes or reactive dyes, which are described in COLOR INDEX. Any dye not described in COLOR INDEX may also be used without any particular limitation so far as it has an anionic group, for example, a sulfonic group or a carboxyl group. Among the water-soluble dyes used herein, those having dependence of solubility on pH may also be included as a matter of course.

Examples of cationic dyes contained in the inks according to the present invention include the following dyes:

Cationic Black Dyes: commercially available products such as Astrazon Black SW (product of Bayer AG), Diaxryl Black SWR-N liq (product of Mitsubishi Kagaku Co., Ltd.) and Kayacel Black CN (product of Nippon Kayaku Co., Ltd.);

Cationic Yellow Dyes: C.I. Basic Yellow 1, 11, 13, 19, 28, 29, 33 and 36;

Cationic Magenta Dyes: C.I. Basic Red 1, 2, 9, 12, 13, 24, 39 and 51, and C.I. Basic Violet 1, 3, 7, 10, 11, 15, 16, 20, 27, 35 and 39; and Cationic Cyan Dyes: C.I. Basic Blue 1, 3, 5, 9, 21, 24, 25, 26, 28, 45, 47, 54, 65, 92, 100, 124 and 147.

In the present invention, the cationic dyes are not limited specially to these cationic dyes. The cationic dyes are desirably contained in a proportion of 0.1 to 15% by weight in their corresponding inks.

The cationic black may be prepared with the above-mentioned cationic yellow (Y), magenta (M) and cyan (C) dyes.

In the case where a pigment is used as a coloring material in the ink used in the present invention, the pigment is used within a range of from 1 to 20% by weight, preferably from 2 to 12% by weight, based on the total weight of the ink.

As a specific example of the pigment used in a black ink in the present invention, may be mentioned carbon black. There may preferably be used carbon black which is, for example, produced in accordance with the furnace process or channel process and which has such properties that the primary particle diameter is 15 to 40 m$\mu$, the specific surface area is 50 to 300 m$^2$/g as determined in accordance with the BET method, the oil absorption is 40 to 150 ml/100 g as determined by using DBP, volatile matter is contained in a range of from 0.5 to 10%, and the pH is 2 to 9. Examples of commercially available carbon black having such properties include No. 2300, No. 900, MCF88, No. 33, No. 40, No. 45, No. 52, MA7, MA8 and No. 2200B (all, products of Mitsubishi Kagaku Co., Ltd.), RAVEN 1255 (product of Columbian Carbon Japan Limited), REGAL 400R, REGAL 330R, REGAL 660R and MOGUL L (all, products of Cabot Company), and Color Black FW1, Color Black FW18, Color Black S170, Color Black S150, Printex 35 and Printex U (all, products of Degussa AG). All these commercially available carbon black products may be preferably used.

As examples of pigments used in yellow, magenta and cyan inks, may be mentioned C.I. Pigment Yellow 1, C.I. Pigment Yellow 2, C.I. Pigment Yellow 3, C.I. Pigment Yellow 13, C.I. Pigment Yellow 16 and C.I. Pigment Yellow 83; C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 112 and C.I. Pigment Red 122; and C.I. Pigment Blue 1, C.I. Pigment Blue 2, C.I. Pigment Blue 3, C.I. Pigment Blue 15:3, C.I. Pigment Blue 16, C.I. Pigment Blue 22, C.I. Vat Blue 4 and C.I. Vat Blue 6, respectively. However, the pigments are not limited to these pigments. It goes without saying that those newly prepared for the practice of the present invention may also be used in addition to the above pigments.

Combinations of the ink and liquid composition, which are different in polarity from each other, used in the image forming method according to the present invention include:

(1) a combination of a liquid composition comprising a cationic compound with an ink comprising an anionic compound;

(2) a combination of a liquid composition comprising a cationic compound with an ink comprising a dye or pigment having an anionic group;

(3) a combination of a liquid composition comprising a cationic compound with an ink comprising an anionic compound and a dye or pigment containing an anionic group;

(4) a combination of a liquid composition comprising an anionic compound with an ink comprising a cationic compound;

(5) a combination of a liquid composition comprising an anionic compound with an ink comprising a dye or pigment having a cationic group; and (6) a combination of a liquid composition comprising an anionic compound with an ink comprising a cationic compound and a dye or pigment having a cationic group.

The image forming method according to the present invention will now be described. The image forming method according to the present invention to apply an ink to a printing medium comprises applying a liquid composition having a polarity different from a polarity of the ink to an image forming region formed by the ink and the vicinity of the image forming region on the printing medium prior to the application of the ink, wherein a surface tension of the liquid composition is higher than that of the ink.

The term "image forming region" as used herein means a region of a printing medium, to which dots of the ink are applied, while the term "the vicinity of the image forming region" means an outside region about 1 to 5 dots away from the region to which dots of the ink are applied.

Any method may be used as the image forming method according to the present invention so far as it is a method in which the liquid composition and ink according to the present invention can be caused to coexist on a printing medium, and the surface tension of the liquid composition to be ejected first is higher than that of the ink ejected later. No particular limitation is imposed on the time required from the time the liquid composition is applied to the printing medium up to the time the ink is then applied to the printing medium. However, it is preferable to apply the ink to the printing medium at almost the same time so far as the ink is applied substantially later, or within several seconds.

No particular limitation is imposed on the recording (printing) medium used in the image forming method, and the so-called plain paper such as paper for copying and bond paper, which are routinely used, are suitably used. It goes without saying that coated paper specially prepared for ink-jet recording, and transparent films for OHP may also be suitably used, and besides general-purpose woodfree paper and glossy paper may also be suitably used.

As a method for applying the liquid composition to the printing medium, it is also considered to apply the liquid composition to the whole surface of the printing medium by a sprayer, roller or the like. However, the application is preferably carried out by an ink-jet system by which the liquid composition can be applied selectively and evenly only to the image forming region where the ink ill be applied, and the vicinity of the image forming region. At this time, various kinds of ink-jet recording systems may be used. However, a system in which bubbles generated by thermal energy are used to eject droplets is particularly preferred.

As a suitable method and apparatus for conducting recording with the inks according to the present invention, may be mentioned an ink-jet recording method and apparatus, in which thermal energy is applied to an ink within a recording head in response to recording signals, and droplets of the ink are generated by the thermal energy.

Figure 2:
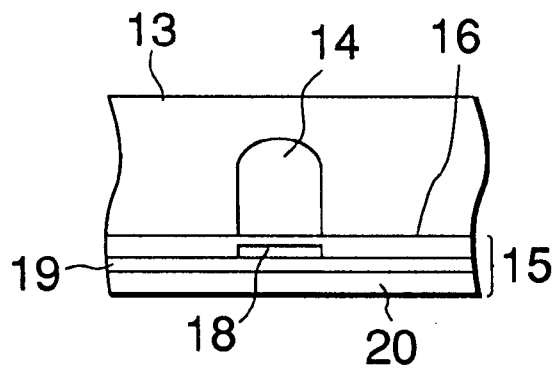
FIG. 2 is a transverse cross-sectional view of the head of the ink-jet recording apparatus.
Figure 3:
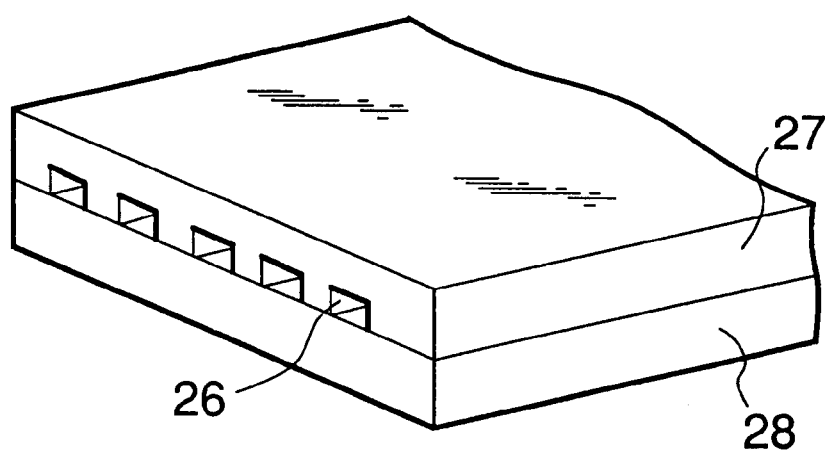
FIG. 3 is a perspective view of the appearance of another head of the ink-jet recording apparatus.

Examples of the construction of a recording head, which is a main component of such an apparatus, are illustrated in FIGS. 1, 2 and 3.

A head 13 is formed by bonding a glass, ceramic or plastic plate or the like having a groove 14 through which an ink is passed, to a heating head 15, which is used for thermal recording and has a heating resistor (the drawings show a head to which, however, the invention is not limited). The heating head 15 is composed of a protective film 16 formed of silicon oxide or the like, aluminum electrodes 17-1 and 17-2, a heating resistor layer 18 formed of nichrome or the like, a heat accumulating layer 19, and a substrate 20 made of alumina or the like having a good heat radiating property.

An ink 21 comes up to an ejection orifice (minute opening) 22 and forms a meniscus 23 due to a pressure (not illustrated).

Now, upon application of electric signals to the electrodes 17-1 and 17-2, the heating head 15 rapidly generates heat at the region shown by n to form bubbles in the ink 21 which is in contact with this region. The meniscus 23 of the ink is projected by the action of the pressure thus produced, and the ink 21 is ejected from the orifice 22 to a recording medium 25 in the form of recording droplets 24.

FIG. 3 illustrates an appearance of a multi-head composed of an array of a number of heads as shown in FIG. 1. This multi-head is formed by closely bonding a glass plate 27 having a number of grooves 26 to a heating head 28 similar to the head as illustrated in FIG. 1.

Incidentally, FIG. 1 is a cross-sectional view of the head 13 taken along the flow path of the ink, and FIG. 2 is a cross-sectional view taken along line 2—2 in FIG. 1.

Figure 4:
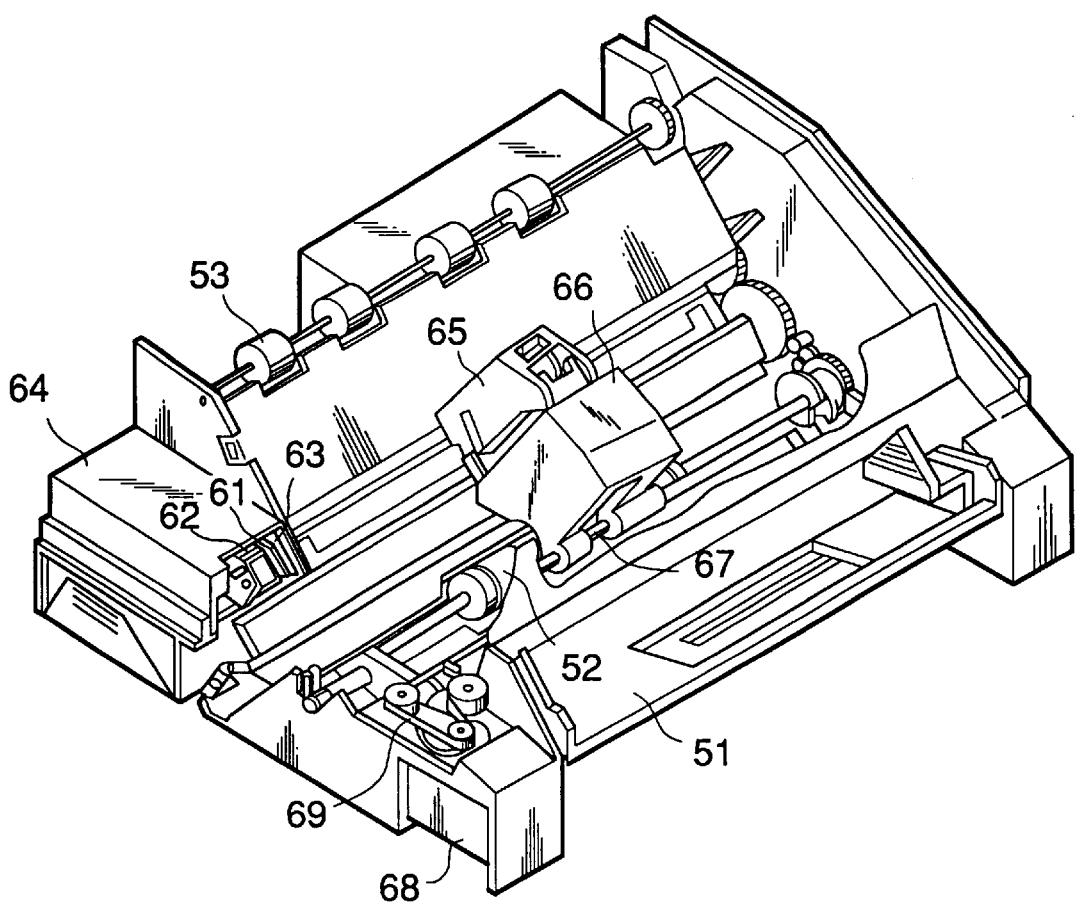
FIG. 4 is a perspective view of an illustrative ink-jet recording apparatus.

FIG. 4 illustrates an example of an ink-jet recording apparatus in which such a head has been incorporated.

In FIG. 4, reference numeral 61 designates a blade serving as a wiping member, one end of which is a stationary end held by a blade-holding member to form a cantilever. The blade 61 is provided at a position adjacent to a region in which a recording head operates, and in this embodiment, is held in such a form that it protrudes into the course through which the recording head is moved. Reference numeral 62 indicates a cap, which is provided at a home position adjacent to the blade 61, and is constituted so that it moves in a direction perpendicular to a direction in which the recording head is moved and comes into contact with the face of ejection openings to cap it. Reference numeral 63 denotes an ink-absorbing member provided adjoiningly to the blade 61 and, similar to the blade 61, held in such a form that it protrudes into the course through which the recording head is moved. The above-described blade 61, cap 62 and absorbing member 63 constitute an ejection-recovery portion 64, where the blade 61 and absorbing member 63 remove water, dust and/or the like from the face of the ink-ejecting openings.

Reference numeral 65 designates the recording head having an ejection-energy-generating means and serving to eject ink onto a recording medium set in an opposing relation to the ejection opening face provided with ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a feeding part from which the recording media are separately inserted, and feed rollers driven by a motor (not illustrated), respectively. With such a construction, the recording medium is fed to the position opposite to the ejection opening face of the recording head 65, and discharged from a discharge section provided with discharge rollers 53 with the progress of recording.

In the above construction, the cap 62 in the head recovery portion 64 is receded from the path of motion of the recording head 65 when the recording head 65 is returned to its home position, for example, after completion of recording, and the blade 61 remains protruded into the path of motion. As a result, the ejection opening face of the recording head 65 is wiped. When the cap 62 comes into contact with the ejection opening face of the recording head 65 to cap it, the cap 62 is moved so as to protrude into the path of motion of the recording head.

When the recording head 65 is moved from its home position to the position at which recording is started, the cap 62 and the blade 61 are at the same positions as the positions for the wiping as described above. As a result, the ejection opening face of the recording head 65 is also wiped at the time of this movement.

The above movement of the recording head 65 to its home position is made not only when the recording is completed or the recording head 65 is recovered for ejection, but also when the recording head 65 is moved between recording regions for the purpose of recording, during which it is moved to the home position adjacent to each recording region at given intervals, where the ejection opening face is wiped in accordance with this movement.

Figure 5:
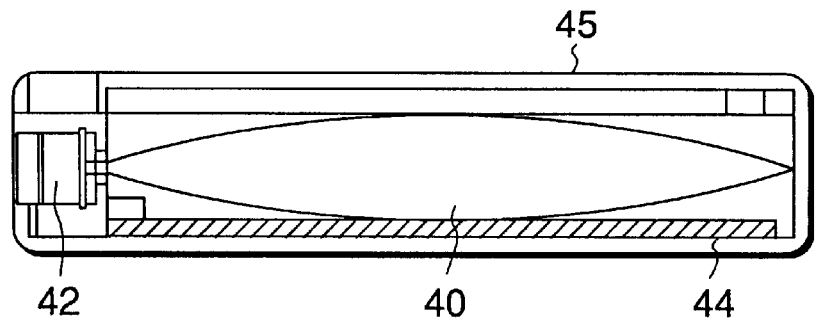
FIG. 5 is a longitudinal cross-sectional view of an ink cartridge.

FIG. 5 illustrates an exemplary ink cartridge 45 in which an ink to be fed to the head through an ink-feeding member, for example, a tube is contained. Here, reference numeral 40 designates an ink container containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink absorbing member for receiving a waste ink. It is preferred in the present invention that the ink container is formed of a polyolefin, in particular, polyethylene, at its surface with which the ink comes into contact.

The ink-jet recording apparatus used in the present invention are not limited to the apparatus as described above in which the head and the ink cartridge are separately provided. Therefore, a device in which these members are integrally formed as shown in FIG. 6 can also be preferably used.

Figure 6:
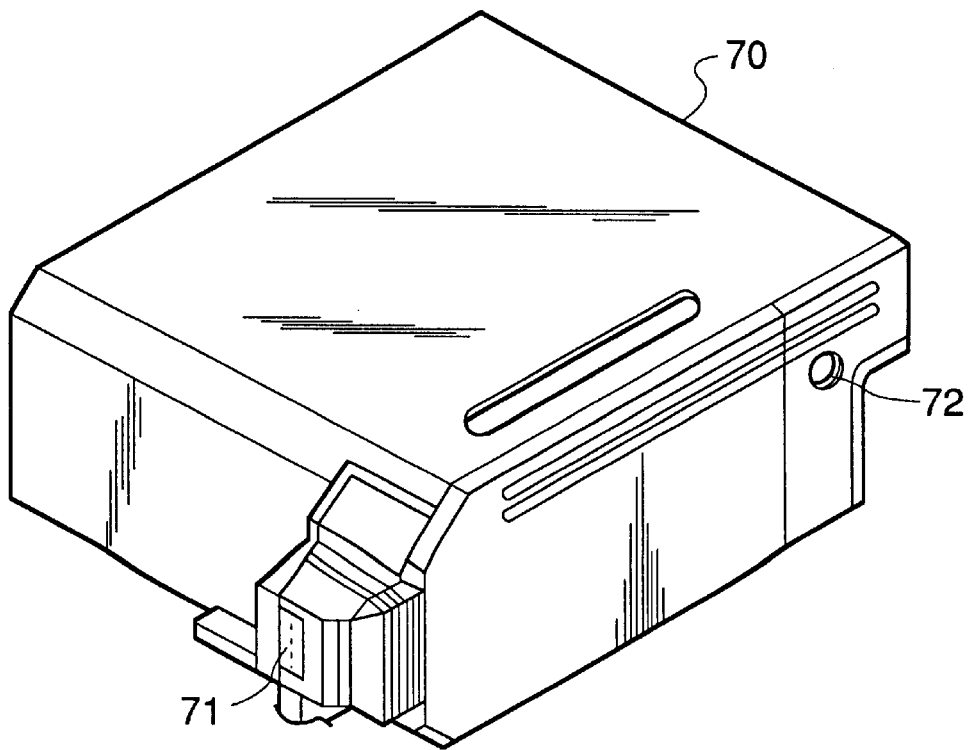
FIG. 6 is a perspective view of a recording unit.

In FIG. 6, reference numeral 70 designates a recording unit, in the interior of which an ink container containing an ink, for example, an ink-absorbing member, is contained. The recording unit 70 is constructed so that the ink in such an ink-absorbing member is ejected in the form of ink droplets through a head 71 having a plurality of orifices. In the present invention, polyurethane, cellulose or polyvinyl acetate is preferably used as a material for the ink-absorbing member.

Reference numeral 72 indicates an air passage for communicating the interior of the recording unit 70 with the atmosphere. This recording unit 70 can be used in place of the recording head shown in FIG. 4, and is detachably installed on the carriage 66.

Incidentally, in the recording apparatus used in the present invention, the ink-jet recording apparatus in which thermal energy is applied to an ink to eject droplets of the ink has been described by way of example. However, the present invention can also be used in other ink-jet recording apparatus such as a piezo-system using a piezoelectric element.

Figure 7:
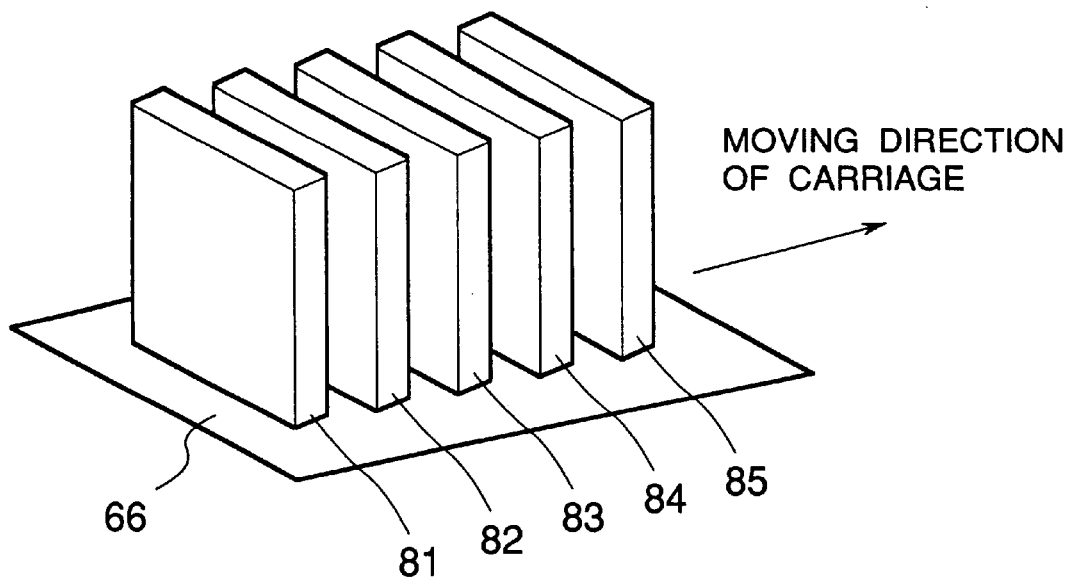
FIG. 7 is a perspective view illustrating a recording part used in examples of the present invention, in which a plurality of recording heads is arranged.
Figure 8:
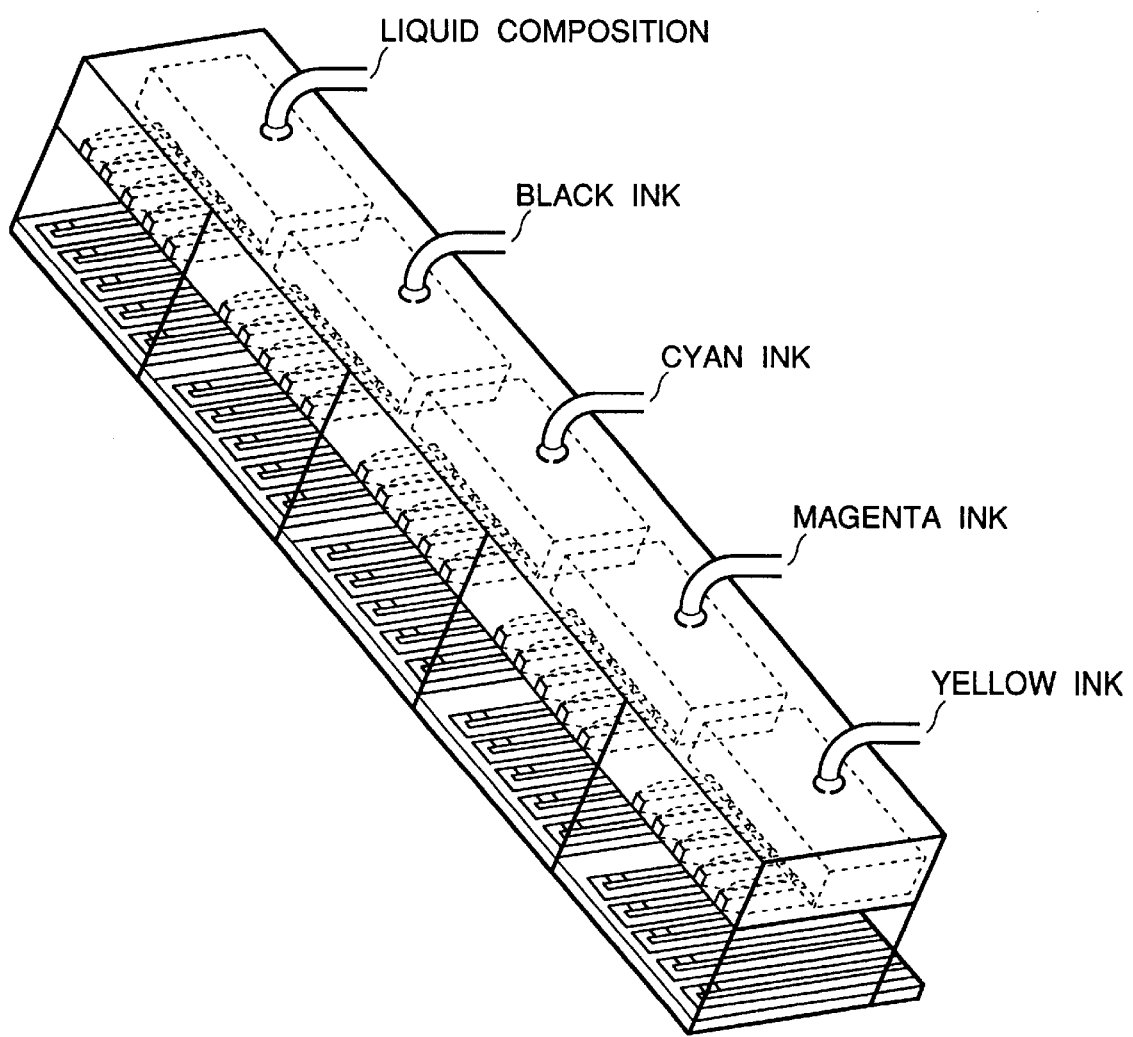
FIG. 8 is a perspective view of another recording head used in the present invention.

In the case where the recording method according to the present invention is carried out, for example, a recording apparatus in which five recording heads, each of which has been illustrated in FIG. 3, are arranged on a carriage 66, is used. An example thereof is illustrated in FIG. 7. Reference numerals 81, 82, 83 84 and 85 indicate recording heads for ejecting recording inks of yellow, magenta, cyan and black colors, and a liquid composition, respectively. As the head for ejecting the liquid composition, may be used the above-described head for ink. The recording heads are arranged in the above-described recording apparatus and serve to eject the respective recording inks of the different colors and the liquid composition in response to recording signals. FIG. 7 shows the case where the five recording heads have been used. However, the present invention is not limited thereto. As shown in FIG. 8, preference is given even to the case where the flow paths of the yellow, magenta, cyan and black inks and the liquid composition are separately provided in one recording head to conduct recording.

The present invention will hereinafter be described more specifically by the following Examples and Comparative Example.

Incidentally, all designations of "part" or "parts" and "%" as will be used in the following examples mean part or parts by weight and % by weight unless expressly noted.

The following respective components were mixed and thoroughly stirred into solutions, and the resultant solutions were then filtered under pressure through a Fluoropore filter (trade name; product of Sumitomo Electric Industries, Ltd.) having a pore size of 0.45 $\mu$m. The resulting filtrates were adjusted to a pH of about 5 with components for forming salts of the respective compounds, thereby obtaining Liquid Compositions A1 to A3 according to the present invention.

In the respective compositions, "Balance" in the amount of water means an amount expressed by the equation:

Balance=100 (parts)−total weight (parts) of the components other than water.

<Measurement of surface tension>

Surface tensions of individual liquid compositions and inks at 25° C. were measured by means of a SURFACE TENSIOMETER/CBVP-A3 (trade name, manufactured by Kyowa Kaimen Kagaku K.K.).

<Liquid Compositions>

| A1: Surface tension $\gamma$ = 58 dyne/cm | |
|---|---|
| Triethylene glycol | 10 parts |
| Thiodiglycol | 13 parts |
| Polyallylamine hydrochloride (Mw = 10,000; product of Nitto Boseki Co., Ltd.) | 4 parts |
| Water | Balance. |
| A2: Surface tension $\gamma$ = 45 dyne/cm | |
| Glycerol | 10 parts |
| Diethylene glycol monobutyl ether | 1 part |
| Triethylene glycol monoethyl ether | 1 part |
| Polyallylamine hydrochloride (Mw = 10,000; product of Nitto Boseki Co., Ltd.) | 3 parts |
| Water | Balance. |
| A3: Surface tension $\gamma$ = 50 dyne/cm | |
| Glycerol | 10 parts |
| Diethylene glycol | 7 parts |
| Polyacrylic acid type polymer Julymer AC-10S (trade name; product of Nihon Junyaku Co., Ltd.) | 1.5 parts |
| Isopropyl alcohol | 3 parts |
| Water | Balance. |

<Inks>
<First Ink Group>

The following respective components were mixed and thoroughly stirred into solutions, and the resultant solutions were then filtered under pressure through a Fluoropore filter (trade name; product of Sumitomo Electric Industries, Ltd.) having a pore size of 0.45 $\mu$m, thereby obtaining Inks Y1, M1, C1 and BK1 of yellow, magenta, cyan and black colors, respectively, in the present invention. The Inks Y1, M1, C1 and BK1 are called first Ink Group collectively.

| Yellow Ink Y1: Surface tension $\gamma$ = 32 dyne/cm | |
|---|---|
| C.I. Direct Yellow 86 | 2.5 parts |
| Glycerol | 10 parts |
| Urea | 5 parts |
| Acetylenol EH (trade name; product of Kawaken Fine Chemicals Co., Ltd.) | 1 part |
| Water | Balance. |
| Magenta Ink M1: Surface tension $\gamma$ = 32 dyne/cm | |
| C.I. Acid Red 289 | 2.5 parts |
| Thiodiglycol | 10 parts |
| Diethylene glycol | 10 parts |
| Acetylenol EH (trade name; product of Kawaken Fine Chemicals Co., Ltd.) | 1 part |
| Water | Balance. |
| Cyan Ink C1: Surface tension $\gamma$ = 32 dyne/cm | |
| C.I. Direct Blue 199 | 3 parts |
| Glycerol | 10 parts |
| Urea | 7 parts |
| Acetylenol EH (trade name; product of Kawaken Fine Chemicals Co., Ltd.) | 1 part |
| Water | Balance. |
| Black Ink BK1: Surface tension $\gamma$ = 44 dyne/cm | |
| C.I. Food Black 2 | 3 parts |
| Glycerol | 10 parts |
| Polyethylene glycol | 7 parts |
| Isopropyl alcohol | 5 parts |
| Water | Balance. |

<Second Ink Group>

The following respective components were mixed and thoroughly stirred into solutions, and the resultant solutions were then filtered under pressure through a Fluoropore filter (trade name; product of Sumitomo Electric Industries, Ltd.) having a pore size of 0.45 $\mu$m, thereby obtaining Inks Y2, M2, C2 and BK2 of yellow, magenta, cyan and black colors, respectively, in the present invention. The Inks Y2, M2, C2 and BK2 are called second Ink Group collectively.

| Yellow Ink Y2: Surface tension $\gamma$ = 22 dyne/cm | |
|---|---|
| C.I. Direct Yellow 86 | 2 parts |
| Glycerol | 9 parts |
| Urea | 9 parts |
| Surflon 113 (trade name; product of Asahi Glass Co., Ltd.) | 0.15 parts |
| Water | Balance. |
| Magenta Ink M2: Surface tension $\gamma$ = 21 dyne/cm | |
| C.I. Acid Red 289 | 2.5 parts |
| Thiodiglycol | 10 parts |
| Diethylene glycol | 10 parts |
| Surflon 113 (trade name; product of Asahi Glass Co., Ltd.) | 0.15 parts |
| Water | Balance. |

-continued

| Cyan Ink C2: Surface tension $\gamma$ = 22 dyne/cm | |
|---|---|
| C.I. Direct Blue 199 | 3 parts |
| Glycerol | 8 parts |
| Surflon 113 (trade name; product of Asahi Glass Co., Ltd.) | 0.15 parts |
| Water | Balance. |
| Black Ink BK2: Surface tension $\gamma$ = 40 dyne/cm | |
| C.I. Direct Black 195 | 2.5 parts |
| Glycerol | 10 parts |
| Polyethylene glycol | 5 parts |
| Isopropyl alcohol | 7 parts |
| Water | Balance. |

<Third Ink Group>

The following respective components were mixed and thoroughly stirred into solutions, and the resultant solutions were then filtered under pressure through a Fluoropore filter (trade name; product of Sumitomo Electric Industries, Ltd.) having a pore size of 0.45 μm, thereby obtaining Inks Y3, M3, C3 and BK3 of yellow, magenta, cyan and black colors, respectively, in the present invention. The Inks Y3, M3, C3 and BK3 are called third Ink Group collectively.

| Yellow Ink Y3: Surface tension $\gamma$ = 32 dyne/cm | |
|---|---|
| C.I. Basic Yellow 11 | 2 parts |
| Diethylene glycol | 10 parts |
| Glycerol | 5 parts |
| Acetylenol EH (trade name; product of Kawaken Fine Chemicals Co., Ltd.) | 1 part |
| Water | Balance. |
| Magenta Ink M3: Surface tension $\gamma$ = 31 dyne/cm | |
| C.I. Basic Red 12 | 1.5 parts |
| Glycerol | 7 parts |
| Urea | 5 parts |
| Triethylene glycol | 5 parts |
| Acetylenol EH (trade name; product of Kawaken Fine Chemicals Co., Ltd.) | 1 part |
| Water | Balance. |
| Cyan Ink C3: Surface tension $\gamma$ = 32 dyne/cm | |
| C.I. Basic Blue 100 | 2.5 parts |
| Thiodiglycol | 7 parts |
| Diethylene glycol | 5 parts |
| Acetylenol EH (trade name; product of Kawaken Fine Chemicals Co., Ltd.) | 1 part |
| Water | Balance. |
| Black Ink BK3: Surface tension $\gamma$ = 45 dyne/cm | |
| Kayacel Black CN (trade name; product of Nippon Kayaku Co., Ltd.) | 3 parts |
| Glycerol | 7 parts |
| Urea | 6 parts |
| Isopropyl alcohol | 5 parts |
| Water | Balance. |

EXAMPLE 1

The thus-obtained Liquid Composition A1 and Inks of the first Ink Group were used to prepare an ink set according to the present invention, and recording was then conducted on PPC paper (product of Canon Inc.) with the ink set.

The same recording apparatus as shown in FIG. 4 was used as an ink-jet recording apparatus to form color images using 5 recording heads as illustrated in FIG. 7. In this recording, Liquid Composition A1 was first ejected to apply it to the recording paper in advance, after which Inks of the first Ink Group were applied. When a printer BJC 600J (trade name; manufactured by Canon Inc.) was used, Liquid Composition A1 was charged in the position of a head for black ink, and a tank for black ink was installed in a position next thereto when a black image was printed, while tanks for cyan, magenta and yellow inks were installed in that order when a color image was printed.

Incidentally, these recording conditions are the same throughout Examples and Comparative Example, which will use dye inks described subsequently. The environmental conditions for the printing tests were controlled to 25° C. and 55% RH throughout the examples.

EXAMPLE 2

Liquid Composition A2 prepared in the same manner as Liquid Composition A1 and the same Inks of the 1st Ink Group as those used in Example 1 were used to prepare an ink set according to the present invention, and recording was then conducted under the same conditions as in Example 1. In this example, Liquid Composition A2 was also ejected first to apply it to the recording paper in advance, thereby conducting printing.

EXAMPLE 3

Liquid Composition A2 and Inks of the second Ink Group were used to prepare an ink set according to the present invention, and recording was then conducted under the same conditions as in Example 1. In this example, Liquid Composition A2 was also ejected first to apply it to the recording paper in advance, thereby conducting printing.

EXAMPLE 4

Liquid Composition A3 prepared in the same manner as Liquid Composition A1 and Inks of the third Ink Group were used to prepare an ink set according to the present invention, and recording was then conducted under the same conditions as in Example 1. In this example, Liquid Composition A3 was also ejected first to apply it to the recording paper in advance, thereby conducting printing.

COMPARATIVE EXAMPLE 1

Liquid Composition A4 was prepared by removing isopropyl alcohol from Liquid Composition A3 used in Example 4 and adding 1.5% of Surfynol 440 (trade name; product of Nissin Chemical Industry Co., Ltd.). The surface tension of Liquid Composition A4 was 30 dyne/cm. This Liquid Composition A4 and Inks of the third Ink Group were used to prepare an ink set of the comparative example. Liquid Composition A4 was ejected first to apply it to recording paper in advance, thereby conducting printing.

<Evaluation methods and standards>

(1) Quality of characters:

Black English characters and numerals were printed with the combination of the colorless liquid composition and the black ink in each ink set to visually evaluate the quality of characters in accordance with the following standard:

AA: Feathering was scarcely conspicuous;

A: Feathering was somewhat conspicuous, but no

C: Feathering was conspicuous.

(2) Water fastness:

The predetermined ink set was charged into the printer, English characters and numerals and a solid print were printed on commercially available acid paper and then printing was stopped. The resulting print sample was left over for 1 hour. The optical density of the print sample was then measured by a Macbeth RD915 (trade name, manufacture by Macbeth Co.). Thereafter, the print sample was immersed for at least 3 minutes in a container filled with water, taken out of the container and then air-dried as it is. The optical density of the print sample after the immersion was then measured in the same manner as described above, to thereby evaluate the print sample as to water fastness in accordance with the following standard.

Percent retention of optical density of print sample =
$$\frac{\text{Optical density after immersion test}}{\text{Initial optical density}} \times 100$$

AA: The percent retention of optical density of the print sample was at least 80%;
A: The percent retention of optical density of the print sample was not lower than 60%, but lower than 80%;
B: The percent retention of optical density of the print sample was lower than 60%.

(3) Evaluation as to print quality after continuous printing:

Solid printing was continuously conducted over the whole surfaces of ten (10) sheets of paper by means of a remodeled printer, during which wiping of head faces was conducted once per sheet to visually observe the quality of a print obtained thereafter, thereby evaluating it in accordance with the following standard.

Incidentally, the printer was remodeled in such a manner that wiping and purging can be manually practiced.

AA: Printing was conducted normally;
A: Printing was somewhat disordered.

TABLE 1

|  | Quality of characters | Water fastness | Print quality after continuous printing |
|---|---|---|---|
| Example 1 | AA | AA | AA |
| Example 2 | AA | AA | AA |
| Example 3 | AA | AA | AA |
| Example 4 | AA | AA | AA |
| Comp. Example 1 | AA | AA | A |

As described above, the image forming methods and ink-jet recording methods according to the present invention permit the formation of images having good water fastness and print quality on plain paper, and the provision of images having excellent print quality even in continuous printing.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image forming method for forming an image on a printing medium, comprising the steps of:
   providing a liquid composition;
   providing a black pigment ink and a color pigment ink, each of which reacts with the liquid composition upon contact with the liquid composition on a printing medium; and
   applying the liquid composition and at least one of the black ink and the color ink to a printing medium so as to overlap each other,
   wherein each ink has a surface tension in the range of 20 to 45 dyne/cm at 25° C., and the liquid composition has a surface tension that is higher than the surface tension of each ink.

2. The image forming method according to claim 1, wherein the liquid composition comprises a cationic compound, and each ink comprises an anionic compound.

3. The image forming method according to claim 1, wherein the liquid composition comprises a cationic compound, and each ink comprises a pigment having an anionic group.

4. The image forming method according to claim 1, wherein the liquid composition comprises a cationic compound, and each ink comprises an anionic compound and a pigment having an anionic group.

5. The image forming method according to claim 1, wherein the liquid composition comprises an anionic compound, and each ink comprises a cationic compound.

6. The image forming method according to claim 1, wherein the liquid composition comprises an anionic compound, and each ink comprises a pigment having a cationic group.

7. The image forming method according to claim 1, wherein the liquid composition comprises an anionic compound, and each ink comprises a cationic compound and a pigment having a cationic group.

8. The image forming method according to claim 1, wherein the surface tension of the liquid composition is in the range of 40 to 60 dyne/cm at 25° C.

9. The image forming method according to claim 1, wherein the surface tension of the liquid composition is in the range of 45 to 55 dyne/cm at 25° C.

10. The image forming method according to claim 1, wherein the liquid composition, the black ink and the color ink are applied to the printing medium by an ink-jet system.

11. A recording unit comprising ink containers respectively containing a black ink, a color ink and a liquid composition, and an ink-jet head for ejecting the black ink, the color ink and the liquid composition,
    wherein each of the black ink and the color ink is a pigment ink, and has a surface tension in the range of 20 to 45 dyne/cm at ° C.,
    wherein each ink reacts with the liquid composition upon contact with the liquid composition on a printing medium, and
    wherein the liquid composition has a surface tension that is higher than the surface tension of each ink.

12. The recording unit according to claim 11, wherein the ink-jet head is a type in which thermal energy is applied to the ink-jet ink to eject droplets of ink.

13. The recording unit according to claim 11, wherein each ink container contains an ink-absorbing member therein.

14. The recording unit according to claim 13, wherein each ink absorbing member is formed of polyurethane, cellulose or polyvinyl acetate.

15. An ink-jet recording apparatus comprising a recording unit according to claim 14.

16. An ink cartridge comprising ink containers respectively containing a black ink, a color ink and a liquid composition,
    wherein each ink is a pigment ink and has a surface tension in a range of 20 to 45 dyne/cm at 25° C., wherein each ink reacts with the liquid composition upon contact with the liquid composition on a printing medium, and wherein the liquid composition has a surface tension that is higher than the surface tension of each ink.

17. The ink cartridge according to claim 16, wherein each ink container has a surface formed of a polyolefin with which ink contained in the container comes into contact.

18. An ink-jet recording apparatus comprising an ink cartridge according to claim 16, a recording head for ejecting the black ink, the color ink and the liquid composition, and a feeder for feeding ink and the liquid composition from the ink cartridge to the recording head.

* * * * *

UNITED STATES PATENT AND TRADEMARK OFFICE
CERTIFICATE OF CORRECTION

PATENT NO. : 6,238,045 B1
DATED : May 29, 2001
INVENTOR(S) : Eriko Ono et al.

It is certified that error appears in the above-identified patent and that said Letters Patent is hereby corrected as shown below:

Column 1,
Line 17, "X" should read -- to --.
Line 18, "bubble" should read -- bubbles, --.
Line 28, "have" should read -- have hence --.
Line 31, "attributed" should read -- considered to be attributed --; and "size of" should read -- size on --.

Column 2,
Line 31, "offer" should read -- occurrence --.

Column 8,
Line 53, "ill" should read -- will --.

Column 14,
Line 15, "1st" should read -- first --.
Line 59, ", but no" should read -- ; --.

Column 15,
Line 1, "ture" should read -- tured --.

Column 16,
Line 45, "at ºC.," should read -- at 25 ºC., --.

Signed and Sealed this

Seventeenth Day of December, 2002

JAMES E. ROGAN
*Director of the United States Patent and Trademark Office*